(12) United States Patent
Sachee et al.

(10) Patent No.: US 8,404,326 B2
(45) Date of Patent: Mar. 26, 2013

(54) PANEL MADE OF EXPANDED FOAM WITH HOOKS OR LOOPS

(75) Inventors: Quresh Sachee, Charlotte, NC (US); Jean-Philippe Billarant, Paris (FR)

(73) Assignees: Aplix, Paris (FR); Aplix, Inc., Charlotte, NC (US)

( * ) Notice: Subject to any disclaimer, the term of this patent is extended or adjusted under 35 U.S.C. 154(b) by 269 days.

(21) Appl. No.: 12/807,541

(22) Filed: Sep. 8, 2010

(65) Prior Publication Data

US 2011/0057466 A1 Mar. 10, 2011

(30) Foreign Application Priority Data

Sep. 8, 2009 (FR) ..................................... 09 04267

(51) Int. Cl.
*B32B 3/06* (2006.01)
*B62D 43/06* (2006.01)
(52) U.S. Cl. ............ 428/100; 428/99; 428/120; 24/306; 24/449
(58) Field of Classification Search .................... 428/99, 428/100, 120; 24/306, 449
See application file for complete search history.

(56) References Cited

U.S. PATENT DOCUMENTS 6,651,400 B1 11/2003 Murphy ........................ 52/586.2

FOREIGN PATENT DOCUMENTS

| EP | 0 465 983 A1 | 1/1991 |
|---|---|---|
| FR | 2 869 372 | 10/2005 |

OTHER PUBLICATIONS

French Search Report (dated Oct. 3, 2010—2 pages).

*Primary Examiner* — Alexander Thomas
(74) *Attorney, Agent, or Firm* — Renner, Kenner, Greive, Bobak, Taylor & Weber

(57) ABSTRACT

A panel-forming assembly which is intended to be fixed to a surface of a vehicle or an aircraft, for example the floor of the trunk or a surface of the hatch of the spare-wheel compartment, and comprising, on the one hand, a panel of foam of expanded thermoplastic material, in particular expanded polypropylene or expanded polystyrene, which is constituted of an agglomeration of balls made of thermoplastic material and, on the other hand, hooks and/or loops issuing from the panel and intended to cooperate with loops and/or hooks issuing from the said one surface of a vehicle, characterized in that the assembly comprises an intermediate element (4) comprising a plate (5) from a face of which project the hooks (6) and/or the loops issuing from the panel that cooperate with the loops and/or the hooks (3) issuing from the surface of the vehicle, while from a face opposite the said one face of the plate there projects at least one piece (7) in the form of a fir tree comprising elements in the form of fir-tree branches (9) defining between them intermediate spaces or interstices (d), which piece is inserted into the panel (2).

13 Claims, 3 Drawing Sheets

PANEL MADE OF EXPANDED FOAM WITH HOOKS OR LOOPS

TECHNICAL FIELD

The present invention relates to a panel-forming element comprising a panel made of expanded thermoplastic foam constituted of agglomerated balls, in particular of expanded polypropylene (EPP) or of expanded polystyrene (EPS), and hooks or loops issuing from the panel in order to fix it to another element comprising loops or hooks, in particular to a surface of a vehicle or an aircraft. The present invention also relates to a vehicle or aircraft, to a surface of which an assembly of this type is fixed.

BACKGROUND ART

In known aircraft or automobile vehicles, for example at the level of the compartment for the spare wheel, the hatch of the compartment has a surface which is partially covered with a panel made of expanded polypropylene which is constituted of an agglomeration of balls having an average diameter between in particular 2 mm and 24 mm. The panel made of expanded polypropylene is fixed to the surface of the hatch by means of a device with hooks and loops or with hooks within hooks. For example, a portion with loops, in the form of a strip from which loops project, is fixed by gluing or soldering, in particular with ultrasound, to the panel made of expanded polypropylene, whilst a strip comprising hooks on one of its faces is fixed likewise, for example by gluing or soldering with ultrasound, to the surface of the vehicle (the hatch) to which it is desirable to fix the panel of expanded polypropylene in such a way that the hooks and the loops cooperate in order to ensure this fixation. Of course, conversely it is also possible to provide for the strip with hooks to be arranged on the panel of expanded polypropylene and the portion with loops to be arranged on the surface that is intended to be covered by the panel of expanded polypropylene.

It turns out that the forms of fixation in the vehicles of the prior art do not have good resistance to the extreme temperatures and in particular the conditions of great humidity to which the trunks of the automobile vehicles are exposed in the course of their use, and in particular it often comes about that the panel becomes detached from the automobile vehicle to which it is supposed to be fixed.

DISCLOSURE OF THE INVENTION

The present invention aims to overcome the disadvantages of the prior art by putting forward a panel made of expanded polypropylene or of another foam of expanded thermoplastic material, for example of expanded polystyrene, that comprises an agglomeration of balls with a given average diameter which, when it is fixed to a surface of an automobile vehicle or of an aircraft, remains well fixed there in the course of the lifetime of the latter, and in particular does not have the tendency, under the effect of the humidity or great variations in temperature to which the automobile vehicle or aircraft is subjected in the course of its lifetime, to become detached from the surface of the automobile vehicle to which it is supposed to remain fixed by means of the device with hooks and loops or hooks within hooks.

In accordance with the invention a panel-forming assembly which is intended to be fixed to a surface of an automobile vehicle or an aircraft, for example the floor of the trunk or a surface of the hatch of the spare-wheel compartment, and comprising, on the one hand, a panel of foam of expanded thermoplastic material, in particular expanded polypropylene, which is constituted of an agglomeration of balls made of the thermoplastic material, in particular of balls that have been pressed one against the other in order to obtain the panel, and, on the other hand, loops or hooks issuing from the panel of expanded thermoplastic material in order to cooperate with hooks or loops issuing from the surface of the vehicle, characterised in that the assembly comprises an intermediate element comprising a plate from a face of which project the hooks and/or the loops issuing from the panel that cooperate with the loops and/or the hooks issuing from the surface of the vehicle, whilst from a face opposite the said one face of the plate there projects at least one piece in the form of a fir tree comprising elements in the form of fir-tree branches defining between them intermediate spaces or interstices, which piece is inserted into the panel; the largest dimension, measured perpendicularly to the panel, of the interstice formed between two adjacent and successive branches being greater than at least once the average diameter of the balls of the panel so that when the fir-tree-shaped piece is pushed into the panel in order thus to fix to the panel the hooks and/or the loops which are located on the other side of the plate in relation to the fir-tree piece, at least one ball, preferably a plurality of balls, are sandwiched between two adjacent and successive branches of the fir tree in order thus to ensure good fixation of the hooks and/or the loops to the panel.

It is thus ensured that there is good fixation of the hooks or loops, which are intended to cooperate with loops or hooks issuing from the surface of the automobile vehicle that is intended to be covered by the panel, to the panel without having to effect gluing or soldering with ultrasound that prove to have too short a lifetime in relation to the lifetime of an automobile vehicle, in particular on account of the temperatures and extreme conditions which an automobile vehicle encounters in the course of its use. It has in fact been ascertained that when the hooks or the loops were fixed on the panel by means of gluing or by means of soldering with ultrasound, the glue or ultrasound solder had a tendency to deteriorate in the course of time in such a way that the panel ended up no longer being fixed to the surface that was intended to be covered by the panel in the vehicle. In accordance with the invention it is now ensured throughout the lifetime of the automobile vehicle that there is excellent fixation of the panel to the surface of the automobile vehicle that is intended to be covered by this panel. Moreover, if so desired, it is possible to replace a panel very easily.

Preferably, the fir-tree piece comprises a stem which extends transversely, in particular perpendicularly to the plate.

Preferably, each element in the form of a branch projects laterally from the stem and is delimited in a longitudinal sectional plane, that is, parallel to the axis of the stem, by means of an upper line, in particular a straight line, (that is, on the side opposite the plate) and by a lower line or straight line (that is, on the side of the plate), the two lines or straight lines joining at a distal end point.

The present invention also relates to an aircraft or vehicle, in particular an automobile, having a surface which is at least partly covered by the panel of foam of expanded thermoplastic material of the assembly in accordance with the invention, for example the floor of the trunk or a surface of the hatch of the spare-wheel compartment, hooks or loops issuing from the said one surface and cooperating with the hooks or loops of the panel-forming assembly in order to ensure mutual fixation.

BRIEF DESCRIPTION OF THE DRAWINGS

A preferred embodiment of the invention will now be described by way of example with reference to the drawings in which.

PREFERRED EMBODIMENT FOR CARRYING OUT THE INVENTION

Figure 1:
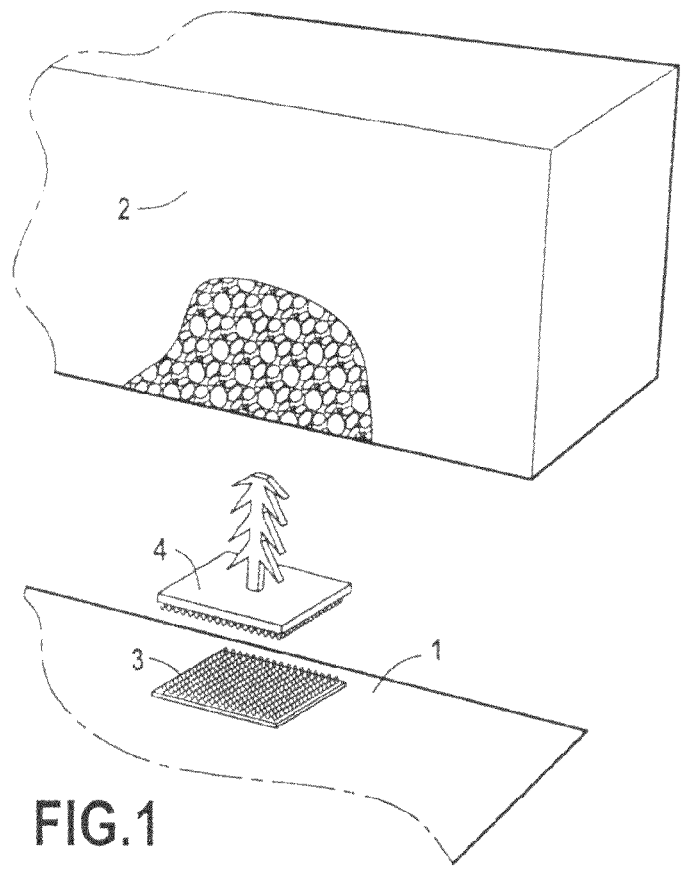
FIG. 1 represents a portion of an automobile vehicle comprising a surface, in particular the floor of the trunk, which is intended to be covered by a panel of expanded polypropylene, represented at a distance from the surface.
Figure 2:
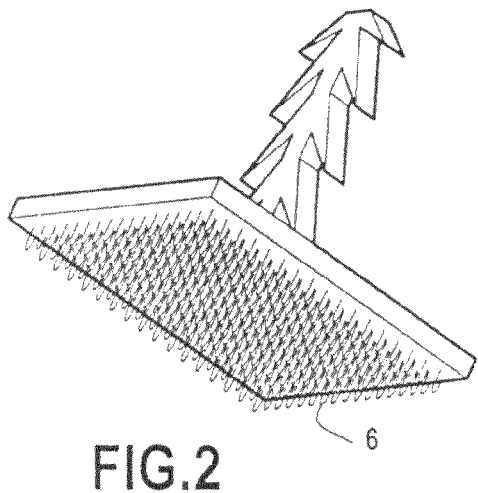
FIG. 2 is a perspective view from below of the intermediate part that is used in FIG. 1.

In FIG. 1 an automobile vehicle is represented that has a trunk floor 1 that is intended to be covered at least in part by a panel 2 of expanded polypropylene constituted of an agglomeration of balls of expanded polypropylene having an average diameter which can be between 2 mm and 24 mm and which in particular here is equal to a value between 2 and 3 mm. Fixed to the surface 1 of the floor of the automobile vehicle there is an element 3 with loops which can, for example, be a knitting or a non-woven with loops, the fixation on the surface 1 of the element 3 with loops being effected, for example, by gluing or by soldering with ultrasound.

Moreover, an intermediate element 4 has been inserted, by pushing, into the panel 2 of expanded polypropylene. This intermediate element 4 is constituted of a plate 5 that is substantially planar and flat with a lower surface (in FIG. 3) from which a plurality of hooks 6 project that have issued from moulding and from a part of the plate 5. These hooks 6 can be realized in particular by moulding. A piece 7 in the form of a fir tree projects from the upper surface (in FIG. 3) of the plate 5. This piece 7 is constituted of a stem 8 from which branches 9 project laterally. The branches 9 extend from the stem 8 on two left and right opposing sides in a symmetrical manner in relation to the axis 7 and a plane passing through the axis 7 and perpendicularly to the right-left axis. The form of the upper branch 9 of the fir tree is defined in longitudinal section, that is, in any plane parallel to that of FIG. 3 passing through the vertical axis of the stem 8, by a lower straight line 10 and an upper straight line 11, each extending from the stem and joining at an end point 12 or 13. The angle between the upper straight line 11 of a branch and the axis of the stem 8 is smaller than the angle between the axis of the stem and the lower straight line 10.

Figure 3:
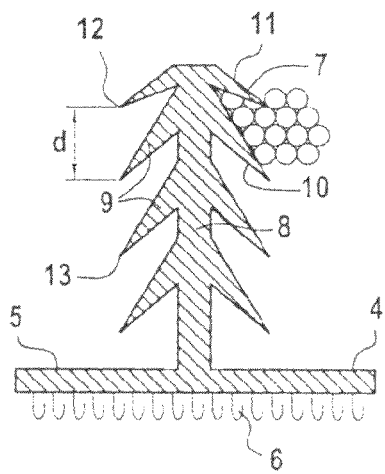
FIG. 3 is a longitudinal sectional view of the element of FIG. 2 in a state in which it is inserted in the panel 2 in accordance with a first embodiment, only a portion of the panel 2 being represented.

The distance between two end points 12, 13 of adjacent or successive branches of the fir tree is defined as being the distance d measured parallel to the axis 8 (vertical) of the stem between two end points, for example 12 and 13 in FIG. 3. This distance d is chosen in such a way as to be strictly greater than the average diameter of the balls of expanded polypropylene that constitute the panel 2 through agglomeration under compression. Preferably, the distance d is greater than several times, in particular 3 or 4 times, the average diameter of the balls of the panel.

Thus, when the fir tree is pushed into the panel 2 it penetrates inside between the balls of polypropylene and balls end up between the successive branches in a given longitudinal sectional plane, this thus allowing excellent fixation of the element 4 to the panel 2 to be ensured. Once this fixation has been ensured, the panel 2 can be fixed to the floor 1 by causing the hooks 6 to cooperate with the loops 3. Of course, instead of the hooks issuing from the lower face of the element 4 it could be arranged for loops to issue from this plate, whilst hooks would be fixed on the floor 1 instead of the loops 3. In accordance with yet another possible embodiment, instead of the loops 3 hooks that are intended to cooperate with the hooks 6 in the manner of self-gripping male-male devices can be provided.

Preferably, hooks are chosen whose shape is not too hooked so that the force that is necessary for the hooks to be drawn out of the loops is lower than the force that is necessary to extract the piece out of the panel by tearing.

The material in which the fir-tree piece is realized is chosen so that the latter is harder and more rigid than the expanded polypropylene of the panel 2. For example, it can be of metal. It can also be made from a thermoplastic resin, such as Polypropylene, polyamide (notably Nylon), Polyethylene or analogous. In particular, the hardness of these resins can be comprised between 70 and 120 R (Rockwell Hardness).

When the harder and more rigid fir-tree piece is introduced into the panel 2, it does not deform and in particular its branches 9 are not turned down towards the stem 8. During the introduction by pushing into the panel 2, the fir-tree piece expels the expanded polypropylene and compresses it to make space for itself. Once the fir-tree piece has been introduced, the polypropylene relaxes and returns to its position before introduction of the fir-tree piece, still preserving, however, a residual compression in relation to its state prior to introduction.

Figure 4:
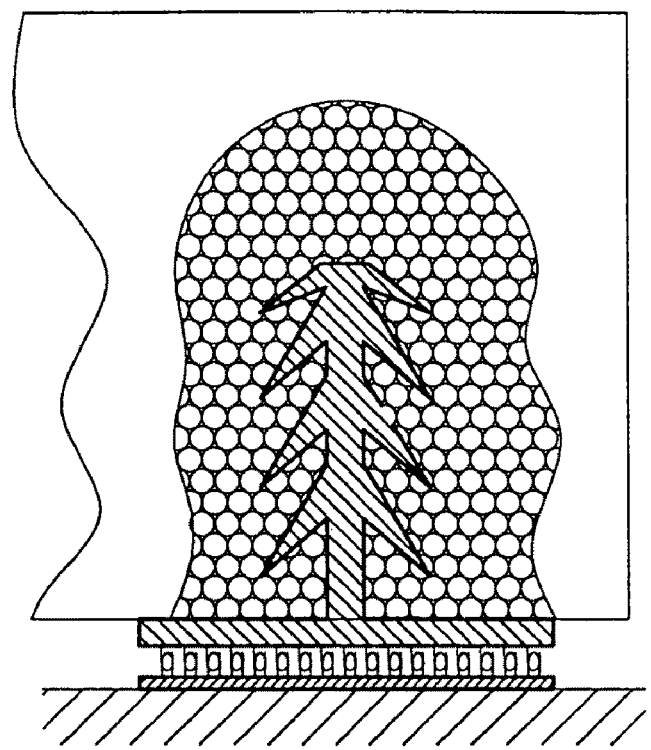
FIG. 4 represents the intermediate element when it has been inserted in the panel, in accordance with the embodiment of FIG. 3, and fixed to the floor 1 by means of the self-gripping hooks and loops.
Figure 5:
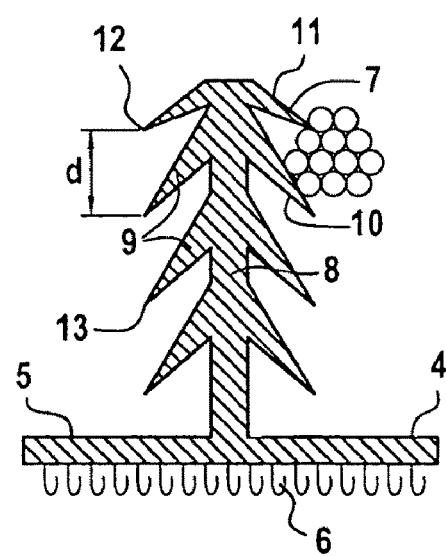
FIG. 5 is a view that is identical to that of FIG. 3, but in accordance with a different embodiment, in which the expanded polypropylene balls do not fill the whole intermediate space between the branches of the fir-tree piece.

In the case of the embodiment of FIG. 4, the expanded polypropylene has returned so far as to fill the intermediate spaces between the branches of the fir tree totally. In this case, the residual compression is the weakest and this is in line solely with the fact that the foam (the expanded polypropylene) no longer fills the space now occupied by the fir-tree piece. In the cases represented in FIGS. 6 and 7, the foam has not returned so far as to occupy the intermediate spaces entirely and remains at a distance, at least in some of the intermediate spaces or inter-branches or interstices, from the stem 8.

Figure 6:
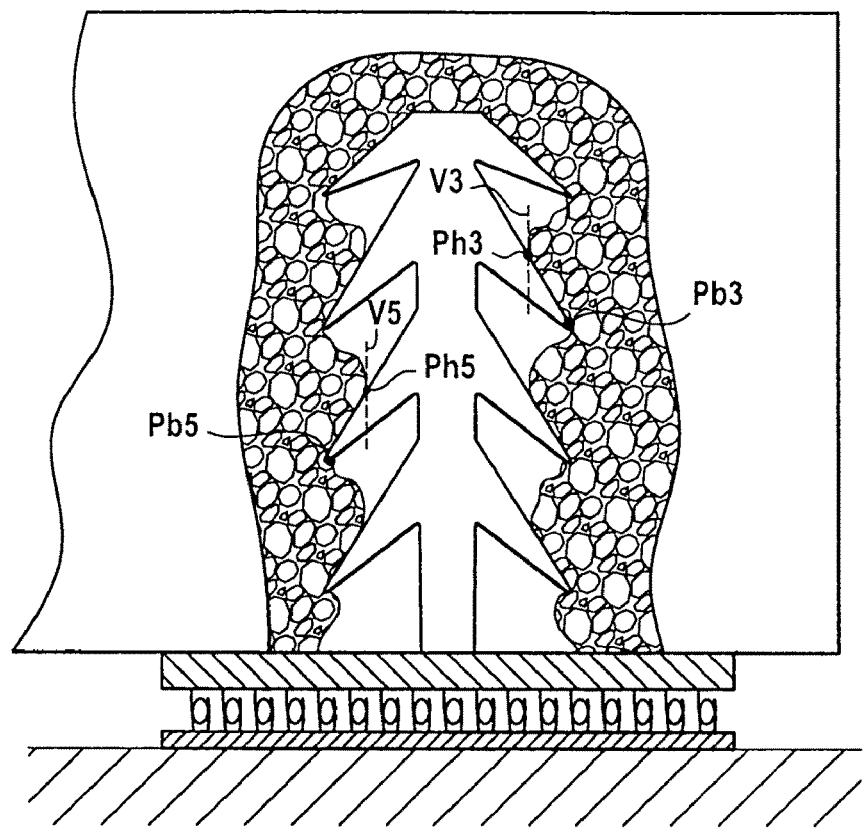
FIG. 6 represents the intermediate element when it has been inserted in the panel, in accordance with the embodiment of FIG. 5, and fixed to the floor 1 by means of the self-gripping hooks and loops.
Figure 7:
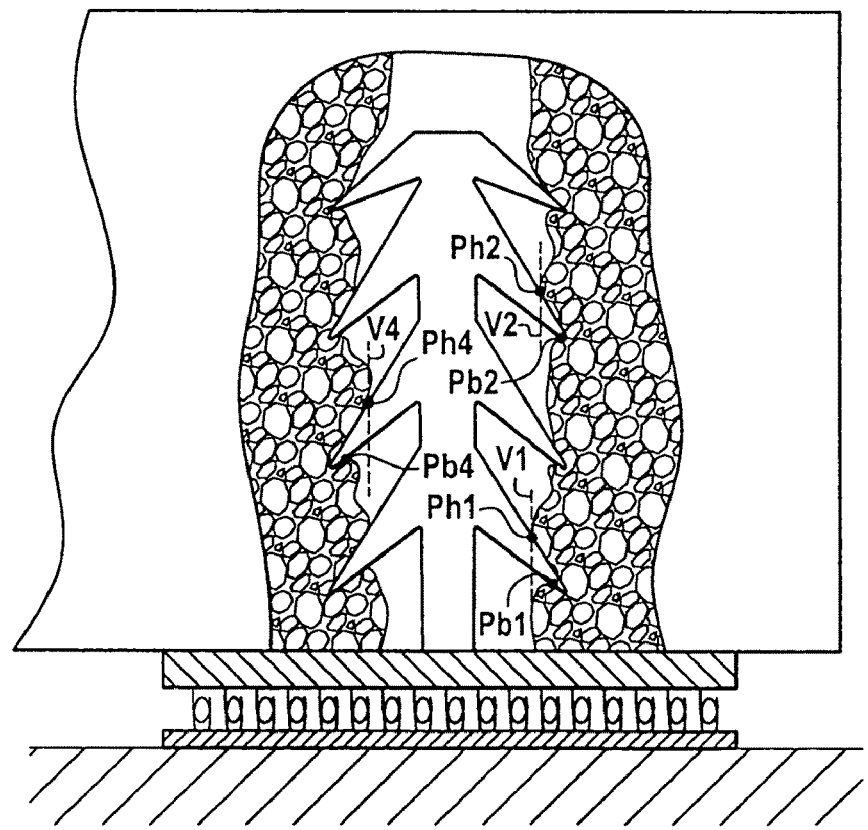
FIG. 7 represents the intermediate element when it has been inserted in the panel, in accordance with yet another embodiment, and fixed to the floor 1 by means of the self-gripping hooks and loops.

In practice, this happens principally as shown in FIGS. 6 and 7, whilst the case of FIG. 4 is more theoretical than practical.

If the point of the upper surface of a given branch of the fir tree as far as where the foam extends whilst in contact with this upper surface is called Ph, and the point of the lower surface of said given branch of the fir tree as far as where the foam extends whilst in contact with this lower surface is called Pb, and if the vertical V (that is, the straight line parallel to the longitudinal axis of the stem) is drawn so as to pass through the point Ph, then at least for one branch of the fir tree, preferably for a majority of the branches of the fir tree, in particular for substantially all the branches of the fir tree, the point Pb is located outside the vertical, that is, on the side of the straight line opposite the stem. In particular, the distance over which the foam is in contact with the lower surface of a branch is less than the distance over which the foam is in contact with the upper surface of the branch.

A plurality of examples of points Ph and Pb and of straight lines V are shown in FIGS. 6 and 7, with the respective references Ph1, Ph2, Ph3, Ph4, . . . and Pb1, Pb2, Pb3, Pb4, . . . , and V1, V2, V3, V4 . . . .

In accordance with one application, the panel has the shape of a horseshoe and is arranged whilst being fixed to the lower face of the hatch of the compartment formed in the floor of the trunk of an automobile vehicle that is intended to receive in particular the spare wheel, the shape of the panel being realized in such a way as to match the outer contour of the spare wheel and the fixation to the lower face of the hatch being effected through cooperation of the hooks and/or the loops issuing from the intermediate part of the panel with hooks and/or loops issuing from the lower face of the hatch.

What is claimed is:

1. A panel-forming assembly which is intended to be fixed to a surface of a vehicle or of an aircraft comprising, a panel of foam of expanded thermoplastic material, which is constituted of an agglomeration of balls made of the thermoplastic material, and hooks and/or loops issuing from the panel and intended to cooperate with loops and/or hooks issuing from the said one surface of a vehicle, characterised in that the assembly comprises an intermediate element (4) comprising a plate (5) from a face of which project the hooks (6) and/or the loops issuing from the panel that cooperate with the loops and/or the hooks (3) issuing from the surface of the vehicle, whilst from a face opposite the said one face of the plate there projects at least one piece (7) in the form of a fir tree comprising elements in the form of fir-tree branches (9) defining between them intermediate spaces or interstices (d), which piece is inserted into the panel (2); the largest dimension (d), measured perpendicularly to the panel, of the interstice formed between two adjacent and successive branches being greater than at least once the average diameter of the balls of the panel so that when the fir-tree-shaped piece is pushed into the panel in order thus to fix to the panel the hooks and/or the loops which are located on the other side of the plate in relation to the fir-tree piece, at least one ball is sandwiched between two adjacent and successive branches of the fir tree in order thus to ensure good fixation of the hooks and/or the loops to the panel.

2. An assembly according to claim 1, characterised in that the material and the shape of the fir-tree piece (7) are such that when the fir-tree piece has been introduced, by pushing, into the panel (2) the piece is not deformed and has expelled the foam by compressing it before the latter, once the piece is inserted, is decompressed in order to return to occupy at least in part at least one intermediate space.

3. An assembly according to claim 1, characterised in that the foam has not returned so far as to occupy completely the at least one intermediate space and remains at a distance from the stem (8) of the piece.

4. An assembly according to claim 3, characterised in that the point of the upper surface of a given branch of the fir tree as far as where the foam extends whilst in contact with this upper surface is called Ph; the point of the lower surface of said given branch of the fir tree as far as where the foam extends whilst in contact with this lower surface is called Pb; and the straight line parallel to the longitudinal axis of the stem passing through the point Ph is called V; and at least for one branch of the fir tree, the point Pb is located outside the straight line V, that is, on the side of the straight line opposite the stem.

5. The assembly of claim 4 wherein in the majority of the branches of the fir tree, the point Pb is located outside the straight line V, that is, on the side of the straight line opposite the stem.

6. The assembly of claim 4 wherein in substantially all of the branches of the fir tree, the point Pb is located outside the straight line V, that is, on the side of the straight line opposite the stem.

7. An assembly according to claim 1, characterised in that the distance over which the foam is in contact with the lower surface of a branch is less than the distance over which the foam is in contact with the upper surface of the said one branch.

8. An assembly according to claim 1, characterised in that the fir-tree piece is made of metal.

9. A vehicle, having a surface which is at least partly covered by the panel of the assembly in accordance with one of claim 1, hooks and/or loops issuing from the said one surface of the vehicle and cooperating with the hooks and/or loops of the panel-forming assembly in order to ensure fixation.

10. The vehicle of claim 9 which is an aircraft.

11. The vehicle of claim 9 which is an automobile.

12. The assembly of claim 1 wherein said expanded thermoplastic material is expanded polypropylene.

13. The assembly of claim 1 wherein said expanded thermoplastic material is expanded polystyrene.

* * * * *